(12) United States Patent
Palumbo et al.

(10) Patent No.: US 11,647,029 B2
(45) Date of Patent: May 9, 2023

(54) PROBING AND RESPONDING TO COMPUTER NETWORK SECURITY BREACHES

(71) Applicant: F-Secure Corporation, Helsinki (FI)

(72) Inventors: Paolo Palumbo, Helsinki (FI); Dmitry Komashinskiy, Helsinki (FI); Szymon Grzybowski, Helsinki (FI)

(73) Assignee: Withsecure Corporation, Helsinki (FI)

( * ) Notice: Subject to any disclaimer, the term of this patent is extended or adjusted under 35 U.S.C. 154(b) by 260 days.

(21) Appl. No.: 16/213,404

(22) Filed: Dec. 7, 2018

(65) Prior Publication Data

US 2019/0182272 A1 Jun. 13, 2019

(30) Foreign Application Priority Data

Dec. 12, 2017 (GB) ...................................... 1720660

(51) Int. Cl.
*H04L 9/40* (2022.01)
*G06F 21/56* (2013.01)
*G06N 7/00* (2023.01)
*G06N 3/08* (2023.01)

(52) U.S. Cl.
CPC ........ *H04L 63/1416* (2013.01); *G06F 21/566* (2013.01); *H04L 63/1433* (2013.01); *H04L 63/20* (2013.01); *G06N 3/08* (2013.01); *G06N 7/00* (2013.01)

(58) Field of Classification Search
CPC ............. H04L 63/1416; H04L 63/1433; G06F 21/556
See application file for complete search history.

(56) References Cited

U.S. PATENT DOCUMENTS

| 10,142,357 | B1* | 11/2018 | Tamersoy | ............ H04L 63/1425 |
| 10,715,541 | B2* | 7/2020 | Griggs | .................. G06F 21/552 |
| 2004/0260947 | A1* | 12/2004 | Brady | ................. H04L 63/1425 726/23 |
| 2007/0153689 | A1* | 7/2007 | Strub | .................. H04L 63/1408 370/230 |

(Continued)

FOREIGN PATENT DOCUMENTS

| CN | 106650436 A | * | 5/2017 |
| CN | 106856478 A | * | 6/2017 |

(Continued)

*Primary Examiner* — Frederick M Brushaber
*Assistant Examiner* — Matthew J. Reda
(74) *Attorney, Agent, or Firm* — Harrington & Smith

(57) ABSTRACT

A method of probing and responding to a security breach in a computer network security system includes defining first and second rules and defining a model to output a probability that a security breach has occurred based on an input and to generate commands. Data is collected at first nodes according to the first rules and a first portion of the collected data is selected and sent from the first nodes to a second node. The selected first portion is input into the model to obtain an output probability that a security breach has occurred and the following steps are performed: determining signs of a security breach, generating a first command with the model to cause a second portion of the collected data to be selected, and generating a second command with the model to cause a change in settings at one or more of the first nodes.

20 Claims, 7 Drawing Sheets

(56) References Cited

U.S. PATENT DOCUMENTS

| | | | |
|---|---|---|---|
| 2007/0255818 A1* | 11/2007 | Tanzer | G06F 21/552 709/224 |
| 2008/0222734 A1* | 9/2008 | Redlich | H04L 63/02 726/26 |
| 2009/0044277 A1* | 2/2009 | Aaron | H04L 63/1433 726/25 |
| 2013/0042320 A1* | 2/2013 | Hearnden | G06F 21/562 726/22 |
| 2015/0264073 A1* | 9/2015 | Tavakoli | H04L 63/1425 726/23 |
| 2016/0028758 A1* | 1/2016 | Ellis | H04L 63/1441 726/25 |
| 2016/0373481 A1* | 12/2016 | Sultan | G06F 21/554 |
| 2017/0111388 A1* | 4/2017 | Mehta | G06F 21/572 |
| 2017/0142148 A1* | 5/2017 | Bu | G06F 21/552 |
| 2017/0171231 A1* | 6/2017 | Reybok, Jr. | G06F 16/23 |
| 2017/0223030 A1* | 8/2017 | Merza | H04L 63/1416 |
| 2017/0223039 A1* | 8/2017 | Mont | H04L 41/40 |
| 2018/0013768 A1* | 1/2018 | Hunt | G06F 21/552 |
| 2018/0048534 A1* | 2/2018 | Banga | G06N 20/00 |
| 2018/0063190 A1* | 3/2018 | Wright | H04L 63/1416 |
| 2018/0288126 A1* | 10/2018 | Smart | H04L 43/08 |
| 2018/0302440 A1* | 10/2018 | Hu | H04L 63/20 |
| 2018/0367550 A1* | 12/2018 | Musuvathi | H04L 63/1425 |
| 2019/0014441 A1* | 1/2019 | Diamanti | G06N 99/00 |
| 2019/0108342 A1* | 4/2019 | Conikee | G06F 21/554 |
| 2019/0317465 A1* | 10/2019 | Wei | G06F 21/577 |
| 2020/0028874 A1* | 1/2020 | Lam | H04L 63/1425 |

FOREIGN PATENT DOCUMENTS

| | | | | |
|---|---|---|---|---|
| GB | 2569302 A | * | 6/2019 | G06F 21/566 |
| WO | WO-2007006194 A1 | * | 1/2007 | H04L 41/5038 |

* cited by examiner

PROBING AND RESPONDING TO COMPUTER NETWORK SECURITY BREACHES

TECHNICAL FIELD

The present invention relates to probing and responding to security breaches in computer networks.

BACKGROUND

The cyber security industry is currently dominated by Endpoint Protection Products (EPPs) which are largely based on object reputation and network access limitation. In EPPs, network security software installed on computers in a network determines whether or not a given computer is compliant with predefined EPP security policy reputation rules. Reputation rules are normally defined by the network security software providers and are based on prior knowledge of what programs, processes, and IP addresses are associated with security risks.

EPPs focus on preventing malicious actors from breaching a network rather than on monitoring and forensically analysing malicious activity once a breach has occurred. One of the reasons for the dominance of EPPs in the Industry is that many organisations hold the view that, once a malicious actor has gained access to a network, significant damage can be done in a short space of time and it is often too late to do anything about it even if the breach is later detected. The logic behind this is that if you can prevent a breach in the first place, there is no need to have processes in place that can monitor activity inside the network for evidence of a breach after it has occurred. As such, many organisations spend significantly more time and resources on breach prevention (achieved by EPPs) than on breach detection and monitoring.

EPPs are also generally not effective against malicious actors who have breached a network without being detected and who are waiting "silently" for the opportune moment to cause damage or steal data. Skilled malicious actors (e.g. malicious actors capable highly sophisticated attacks which may in some instances involve zero-day exploits, and/or could be state sponsored) will often be patient once they gain access to a network. They might run scans of the network infrastructure first, disguising their movements carefully, to avoid revealing themselves. Some industry estimates suggest that the average time between a skilled malicious actor gaining access to a network and their breach being detected is of the order of 200 or more days. This is more than enough time for most skilled malicious actors to accomplish their mission as well as cover their tracks.

Another problem with EPPs is that they are particularly ineffective at dealing with large scale attacks that can bring down entire networks. Irrespective of whether or not a given computer network has actually been targeted, a single infection with, e.g. ransomware, can bring down the whole network and cause widespread damage. This shortcoming of EPPs is made apparent by any one of the many large scale global attacks of recent years including: WannaCry, Petya, Xafecopy Trojan, Stuxnet, and many more. Many of these attacks used zero-day exploits. Given that EPPs guard against known vulnerabilities but struggle against unknown vulnerabilities, EPPs struggle to prevent such attacks. Furthermore, even if the attack is detected, EPPs can only limit damage if the EPP user updates their product. The vast majority of network administrators responsible for large corporate networks do not keep their software up to date (or do so only by applying updates in bulk but infrequently to avoid disruption). This is considered by many to be one of the reasons why WannaCry spread so quickly and extensively.

Despite the dominance of EPPs, a different type of security software has started to become popular. These are known as Endpoint Detection & Response (EDR) products and services. Unlike EPPs, EDR focuses on the detection and monitoring of a breach as it occurs and after it occurs and helps to determine how best to respond. The growth of EDR has been made possible in part by the emergence of machine learning, big data and cloud computing.

EDR deploys data collectors on selected network endpoints (which can be any element of IT infrastructure). The data collectors observe activities happening at the endpoint and then send the collected data to a central, backend system ("EDR backend"), often located in the cloud. When the EDR backend receives the data, the data is processed (e.g. aggregated and enriched) before being analysed and scanned by the EDR provider for signs of security breaches and anomalies.

A problem with EDR however is that the volume of data produced by the data collectors is extremely large. Data volume is normally proportional to the activity occurring at a given EDR endpoint so when activity at that EDR endpoint is great, the produced data volume is also great. The immediate consequences of such large volumes of data are the following:

Decreased Quality of Service

All of the data that the EDR backend receives needs to be processed and analysed. Whilst some of the data will be useful and possibly contain information indicative of a security breach, much of it is likely to be irrelevant for security purposes. In order to determine what data is or isn't useful, all of the data received by the EDR backend needs to be processed and analysed first. The practical consequence of this is that there is an inherent time delay between observation by the data collectors and reaction by the EDR provider and its security teams. It also means that the data used by the security teams to make decisions will not be current as it is subject to the processing and analysing time delay. If security teams do not have current data, it becomes much more difficult to react effectively to potential signs of a breach. It also makes it much easier for a skilled malicious actor to cover up his tracks as he will always be two steps ahead.

Increased Cost of Service

Despite the benefits of ever-improving cloud computing platforms, there is a resource cost (and therefore monetary cost) associated with managing large volumes of data. When high volumes of data need to be processed and made available in a useable format, the associated resource overheads and monetary costs can in some cases be very large for the EDR provider, which in turn can increase the cost of providing EDR to customer organisations. Many organisations thus simply opt not to implement EDR and continue to rely solely on EPPs, which presents a security risk.

Some EDR systems have proposed reducing the data overhead by being selective about what data is collected (i.e. a policy of selective data collection limitation). However, this solution is problematic because effective monitoring, detection and forensic analysis often requires as complete a data picture as possible. It is often not possible to know in advance what data will be required to monitor and track a malicious actor. Realising that key pieces of information were not collected can often put a stop to any investigation, rendering such EDR systems ineffective. EDR systems also presently struggle to provide effective protection against large scale attacks such as WannaCry, Petya, Xafecopy Trojan, Stuxnet, and others due to the data overhead. By the time the huge volume of data has been analysed by security teams using human instinct, experience, intelligent guessing, and traditional statistics, the damage has been done. This is particularly the case where attacks use zero-day exploits and where it is not initially apparent to the human security team what data features to look out for. By the time a human team has worked out what the data actually means, it is often too late.

There is a need for an improved EDR system.

SUMMARY

According to a first aspect of the invention there is provided a method of probing and responding to a security breach in a computer network security system. The method comprises defining first and second rules and defining a model to output a probability that a security breach has occurred based on an input and to generate commands. Data is collected at a plurality of first nodes according to the first rules, said first nodes fowling a first computer network, and a first portion of the collected data is selected according to the first rules. The selected first portion is sent from the first nodes to a second node forming part of a second computer network. The selected first portion is input into the model to obtain an output probability that a security breach has occurred. If the output probability meets predetermined criteria, the following steps are performed: (a) determining that signs of a security breach have been detected, (b) generating a first command with the model to cause a second portion of the collected data to be selected and sent from the first nodes to the second node according to the second rules, and (c) generating a second command with the model to cause a change in the settings at one or more of the first nodes.

The sending of the selected first and second portions may be performed at first predetermined time intervals.

The method may comprise, generating a third command with the model to cause the length of time between each of the first predetermined time intervals to be changed, if the output probability meets predetermined criteria. The changing of length of time may comprise decreasing the length of time between each of the first predetermined time intervals.

The inputting of data into the model may be performed at the first nodes and the generating of first, second, and third commands may be performed at the second node.

The defining of the model may comprise training a neural network using a training data set, and the trained neural network may define first and second rules. Alternatively, defining the model may comprise defining exact or heuristic rules, defining a logic based model, or defining a statistical inference based model.

The method may comprise defining third rules and, if the output probability meets predetermined criteria, generating a fourth command with the model to cause a third portion of the collected data to be selected according to those third rules and to be sent from the first nodes to the second node. The sending of the third portion may be performed at second predetermined time intervals.

The first, second and third portions may comprise one or more selected from the list of: program or file hashes, files stored at the first nodes, logs of network traffic, logs of network connections, process logs, binaries or files carved from memory, and logs from monitoring actions executed by programs running at the first nodes. The training data set may be compiled from the logs from monitoring actions executed by programs running at the first node and said training is determined to be complete when a predetermined error rate threshold has been met or when the model has been trained on a predetermined amount of training data.

The method may comprise storing the collected data at one or more of the first nodes or at a dedicated storage location on the first computer network.

The method may comprise generating a command with the model to cause the remainder of the collected data which does not form part of the first, second, or third portions to be sent from the first nodes to the second node.

The change in settings may comprise one or more of the list of: preventing one or more of the first nodes from being switched off, switching on a firewall at one or more of the first nodes, warning a user of one or more of the first nodes that signs of a security breach have been detected, and/or sending a software update to one or more of the first nodes.

According to a second aspect of the invention, there is provided a network security system. The system comprises a plurality of computers being first nodes in a first computer network, a second computer being a second node in a second computer network, and a model to output a probability that a security breach has occurred based on an Input and to generate commands. The plurality of first computers are configured to collect data at the first node according to first rules, select a first portion of the collected data according to the first rules and to send the selected first portion to the second computer. The plurality of first computers are further configured to receive commands generated by the model to, if the output probability meets predetermined criteria, select a second portion of the collected data according to second rules and send the selected second portion to the second computer, and change settings of one or more of the first computers.

According to a third aspect of the invention, there is provided a computer program product comprising a computer storage medium having computer code stored thereon, which when executed on a computer system, causes the system to operate as a system according to the above second aspect of the Invention.

DETAILED DESCRIPTION

Figure 1:
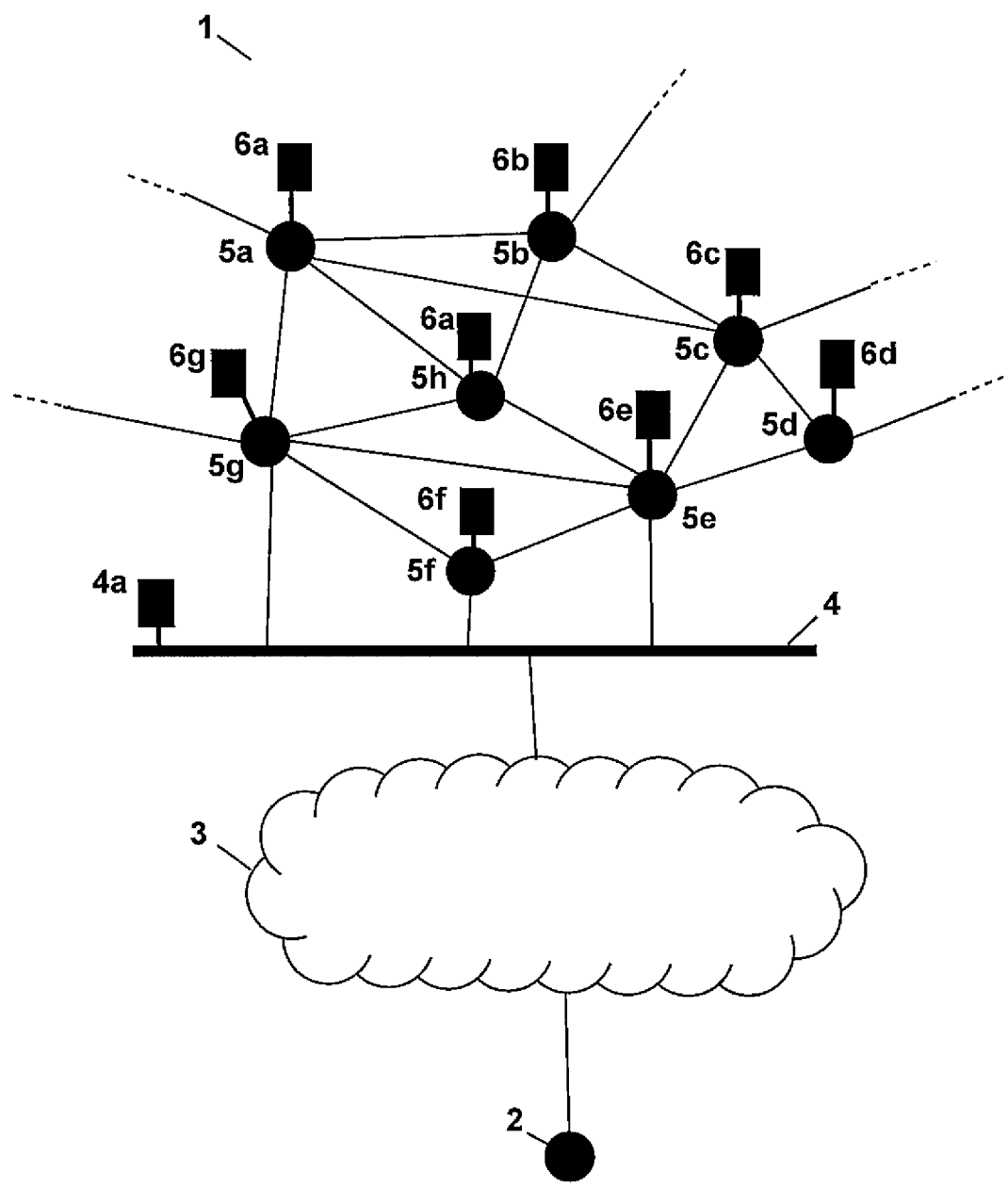
FIG. 1 illustrates schematically a network architecture.

FIG. 1 illustrates schematically a part of a first computer network 1 into which an EDR system has been installed. The first computer network is connected to an EDR backend 2 through the cloud 3. The EDR backend 2 forms a node on a second computer network relative to the first computer network. The second computer network is managed by an EDR system provider and may be separated from the cloud 3 by a gateway or other Interface (not shown) or other network elements appropriate for an EDR backend 2. The first computer network 1 may also be separated from the cloud 3 by a gateway 4 or other interface. Other network structures are also envisaged.

The first computer network 1 is formed of a plurality of Interconnected nodes 5a-5g, each representing an element in the computer network 1 such as a computer, smartphone, tablet, laptop, or other piece of network enabled hardware. Each node 5a-5g shown in the computer network also represents an EDR endpoint onto which a data collector (or "sensor") 6a-6g has been installed. Data collectors may also be installed on any other element of the computer network, such as on the gateway or other interface. A data collector 4a has been installed on the gateway 4 in FIG. 1. The data collectors, 6a-6g, 4a collect various types of data at the nodes 5a-5g or gateway 4 including, for example, program or file hashes, files stored at the nodes 5a-5g, logs of network traffic, process logs, binaries or files carved from memory (e.g. DLL, EXE, or memory forensics artefacts), and/or logs from monitoring actions executed by programs or scripts running on the nodes 5a-5g or gateway 4 (e.g. tcp dumps).

It is envisaged that any type of data which can assist in detecting and monitoring a security breach may be collected by the data collectors 6a-6g, 4a during their lifecycle and that the types of data which are observed and collected may be set according to a set of first rules defined by the EDR system provider upon installation of the EDR system or in response to instructions from the EDR backend 2. For example, the data collectors 6a-6g, 4a may collect data about the behaviour of programs running on an EDR endpoint and can observe when new programs are started. Where suitable resources are available, the collected data may be stored permanently or temporarily by the data collectors 6a-6g, 4a at their respective nodes or at a suitable storage location on the first computer network 1 (not shown).

The data collectors 6a-6g, 4a may also perform some simple, preliminary processing steps on the collected data but this is limited by the computing and network resources available at each node 5a-5g or gateway 4. One of the advantages of the data collectors 6a-6g, 4a is that they are configured to have a small footprint so that they do not disrupt normal functioning of the first computer network 1 through over use of bandwidth or computing power. As such, if the data collectors 6a-6g, 4a perform simple, preliminary processing steps on the collected data themselves, it should not disrupt normal functioning of the first computer network 1.

The data collectors 6a-6g, 4a are set up such that they may send information such as the data they have collected or send and receive instructions to/from the EDR backend 2 through the cloud 3. This allows the EDR system provider to remotely manage the EDR system without having to maintain a constant human presence at the organisation which administers the first computer network 1.

Generally, the proposed approach relies on data collectors (also known as "sensors" as described above) collecting the same amounts and kinds of information. As described above, the selective collection of material can lead to a situation where data is needed but has not been collected immediately, thus hindering security operations. The proposed approach selectively submits some of the collected data during normal operations, and making the remainder of the material available upon request from the EDR system provider in case it is needed. More particularly, during the lifecycle of a data collector, it will observe and record information about the behaviour of programs running on an endpoint. Among other Information, the data collector can observe when new programs are started. When this happens, the data collector will assign a set of default selecting and sending policies (referred to generally as the "verbosity" level) to the newly started program. As explained above, the verbosity will not affect the data collection at the endpoint but has an impact on determining what portion of the collected data is passed on to the EDR backend when it is time for the data to be sent. Verbosity levels can be adjusted upwards and downwards dynamically as programs execute actions. This means in practice that the verbosity level for a particular program can fluctuate during execution. Changes in verbosity are envisaged to affect the sending of data at the next available predetermined time interval and would not force retroactive submission of data. This would however not affect the ability of a separate command to be issued to initiate a full retroactive submission of all data that was collected but not yet sent.

In one example, an EDR system could prioritise minimising the total amount of security data submitted. A verbosity scheme based on three levels could be implemented. Under this scheme, the verbosity levels could be given the names "all", "balanced", and "minimal". By default, when a new program Is started, it is assigned a default verbosity level of "balanced". The idea in this case is that the balanced level would Include the sending of data in a way that achieves optimal trade-off between data volume and security value (i.e. enough data to detect signs of a breach). Whilst this may mean that the system does not operate at maximum detection efficiency, it is an accepted consequence of the chosen system set up which prioritises minimising sent data volume. When certain conditions are met, the verbosity level for a specific program (or group of programs) can be changed. For example, in the case of programs or applications that are well known for not being risky, the verbosity level could be dropped to "minimal", implying that the information submitted to the backend would be only sufficient for the most bare-bone of analyses. In contrast, in the case of programs or applications that are not trusted, for example because they are not known or because they are known to be misused by malicious actors and attackers, the verbosity level can be increased to "all".

Verbosity levels for a specific program can be changed by the data collector itself, by the cloud or EDR backend component or by a combination of these two. In order to produce a decision, these entitles can rely on hardcoded logic (exact rules or heuristic rules) or on more flexible, entity specific techniques that might be based on machine learning, fuzzy logic and statistical Inference.

For example, consider the three-way reporting scheme described above, a data collector ("sensor") could have the following (or similar) hardcoded logic "if hash of program file is known to backend as trustworthy, does not pose security risk then lower the verbosity level to minimal". Where the model is more complex, there could be more advanced sensor-side logic that operates in two modes: "learn program profiles" and "apply program profiles". In first mode case, the data collector uses a "balanced" verbosity level for each program on the basis of checking how typical the observed program's behaviour is according to its learned profile. As a result, the amount of data sent to the backend will be controlled on the grounds of observed differences between expected behaviour of a program and the behaviour of a particular Instance of that program running at a given node. In this scenario, the data collector would start operating in "learn program profies" mode when first Installed. During an initial phase, the data collector would collect and aggregate information about program behaviour common for the particular node ("endpoint") it Is installed on. When enough Information has been collected (or when a predefined condition is met), the data collector has enough data to start constructing probabilistic models that would allow it to switch to "apply program profiles" mode. In this mode, the data collector would be able to assess the probability that a certain program is behaving according to the expected behaviour and lower the verbosity level when this is the case.

Generally, as described above, the invention aims to overcome one of the critical problems of reducing the amount of data sent to the EDR backend: the issue of lack of visibility when it Is needed most. In the proposed approach, when the EDR backend (responsible for the detection of anomalous or malicious activity) is able to determine that a serious security breach is occurring based on the amount of data sent with the current verbosity level, the EDR provider operator (human or machine) can request the data collectors in question for a full retroactive submission of the information that was collected but not sent.

Figure 2:
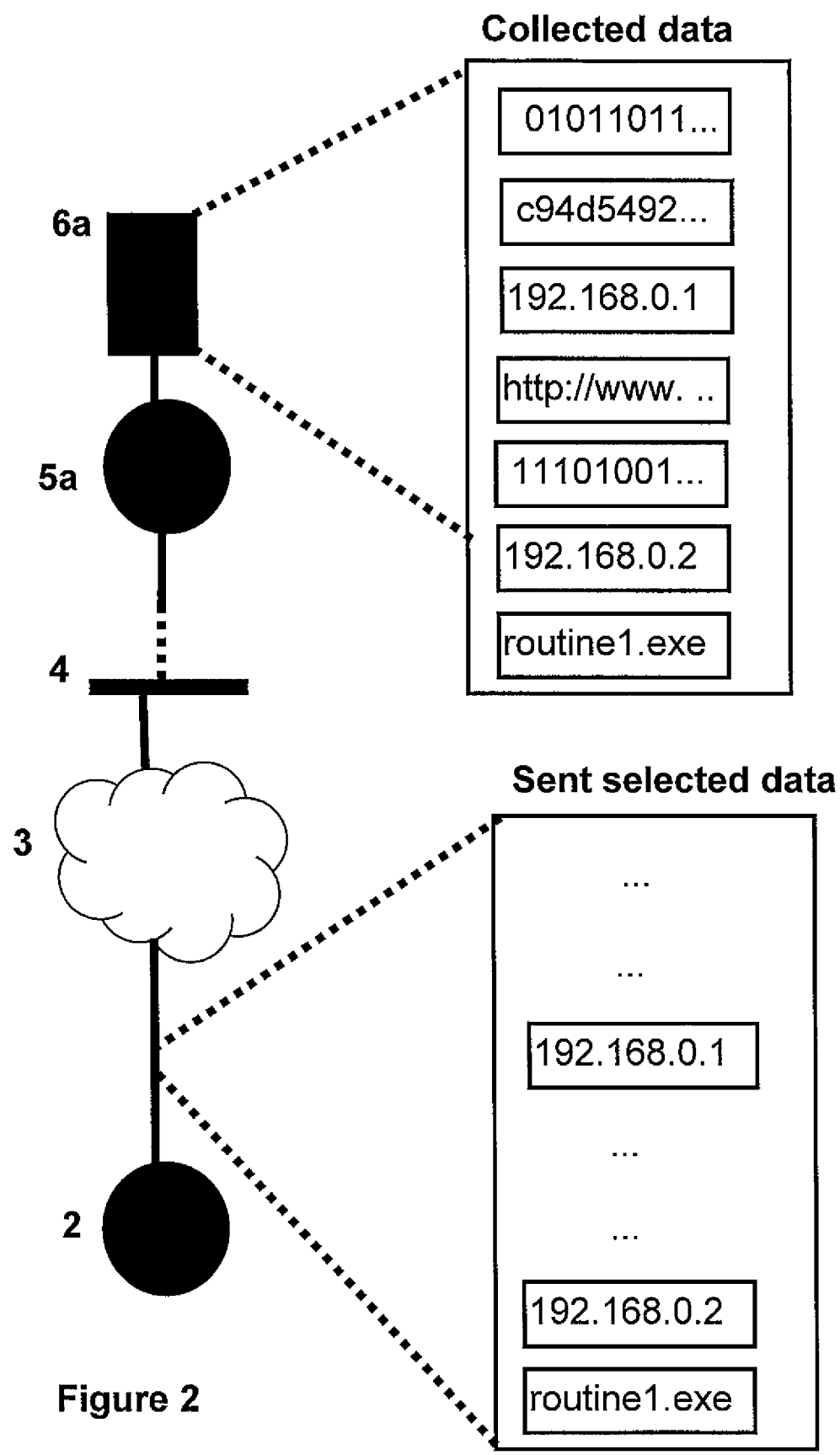
FIG. 2 illustrates schematically a simplified part of the network architecture of FIG. 1.
Figure 3:
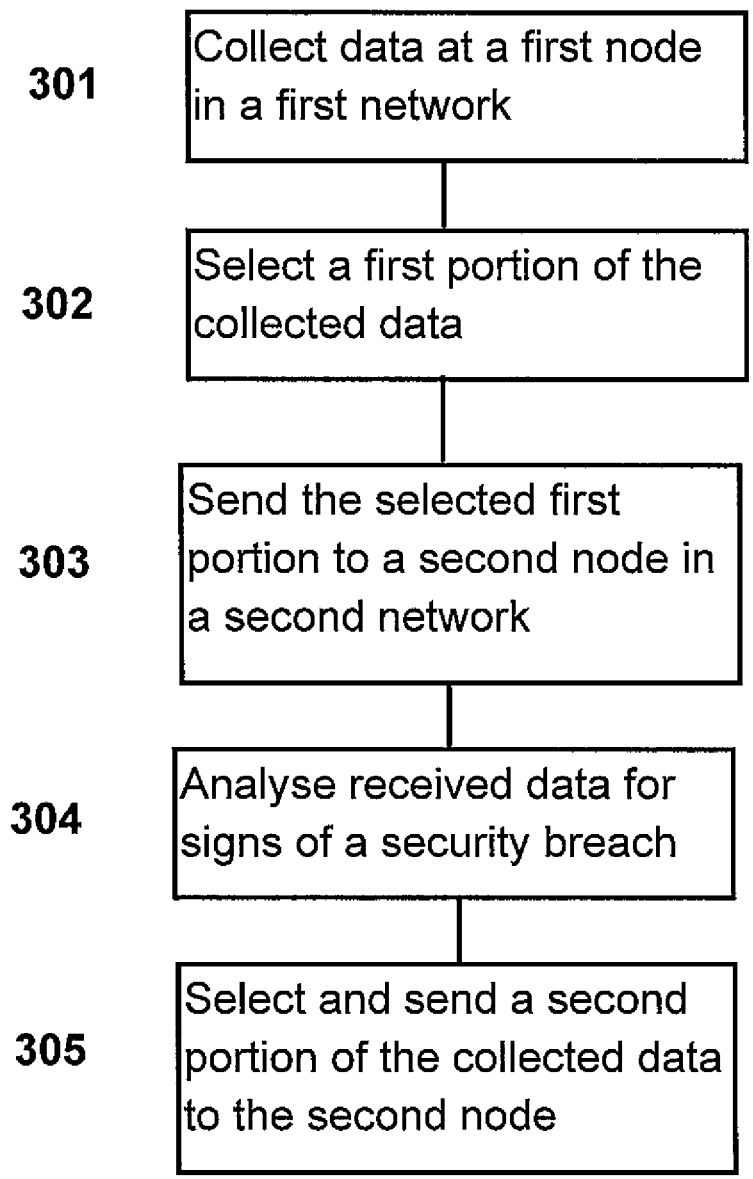
FIG. 3 is a flow diagram Illustrating a method according to an embodiment.

FIG. 2 shows a simplified part of the first computer network 1 and FIG. 3 shows a flowchart describing the steps of a method according to an embodiment.

The data collectors 6a-6g, 4a are initially configured according to the first rules to select as shown in step 302 and send as shown in step 303 only a portion of the collected data as shown in step 301 to the EDR backend 2. By sending only a portion of the collected data to the EDR backend 2, the network and computing resources required by the first computer network 1 to send the data, and those required by the EDR backend 2 to receive, process and analyse the sent portion of data is significantly reduced. Further, whilst not al of the collected data is initially sent to the EDR backend 2, it is not lost. Instead, it remains present at each node or storage facility (not shown) on the first computer network 1, should it later be required.

Once the EDR backend 2 receives the sent portion of collected data from the data collectors 6a-6g, 4a, the received data (which is small in volume) can be processed and analysed to detect as shown in step 304 signs of a security breach much more quickly and efficiently than would be possible had the total volume of collected data been sent to the EDR backend 2.

If signs of a security breach are detected from the information contained in the sent portion of data, or if the EDR system provider's security team take the view that further investigation is merited, the EDR backend 2 can Issue a command to the one or more of the data collectors 6a-6g, 4a to select and send a second portion as shown in step 305 of the collected data to the EDR backend 2. In particular, this may be achieved by defining a set of second rules, different to the first rules, which alter what portion of the collected data is selected and sent to the EDR backend 2. Note that the data collection part of the rules is not altered as it is an object of the invention to alter what data is selected and sent, not to alter what data is collected.

The second portion might be the remainder of the total volume of collected data not initially selected and sent, or it might consist of only a different portion of it. The selection (as defined by the rules) depends on the requirements of the EDR system provider's security team and may be the result of a human decision or a decision taken by an algorithm configured to determine what additional data is required. It is envisaged that there may be a multiplicity of different rule sets (e.g. third and fourth rules and so on) each defined to be suitable for different security situations. For example, the first rules might be defined to select and send small volumes of data and is suitable for low-risk scenarios. The second rules might be defined to select and send a higher volume of data, for example suitable for when suspicious activity is detected (i.e. there are signs of a breach but it's unclear if there is actually a breach. The third rules might be defined to select much greater volumes of data, for example when a beach has been detected and the malicious actor's activities need to be carefully tracked. The fourth rules might be a complete data dump (i.e. select and send everything), for example when there is a serious, dangerous emergency situation in which as much information as possible is required at the EDR backend 2.

It may be advantageous to configure a machine learning algorithm to determine the details of the various sets of rules and to determine when it is appropriate to switch between rule sets. The huge volumes of data and variables involved would make it prohibitively difficult to develop a suitably effective set of rules and an algorithm for switching between them without machine learning.

Once the various rule sets have been defined, they function as a means to dynamically alter the data selection and sending policies autonomously far more efficiently than a team of humans. By way of illustrative example, in a network with ~1300 data collectors, the number of collected data points is typically well over 2 billion per month. Attempting to manually determine what data features are important and what correlations exist in such a data set is prohibitively difficult. Defining a suitable set of rules manually (and when to switch between them) would be based largely on intelligent guess work and traditional statistics. In contrast, using machine learning allows the algorithm to determine what data features are important, what data the rules should be defined to select and send, and when it is important to switch between rules.

As shown in FIG. 2, data collector 6a has collected a large body of various types of data from node 5a (In this case binaries, hashes, network traffic IP address history, browser history and process logs). Data collector 6a in its initial state has been configured to select only the network traffic IP address history and the process logs and to send this selection to EDR backend 2 through gateway 4 via the cloud 3. After receiving the selected data and the information contained therein, EDR backend 2 processes and analyses it for signs of a security breach. If there are signs of a security breach, a command is sent to data collector 6a to select and send either another portion of data (such as one or more of the binaries), or to perform a full data dump by sending the entire remainder of the collected data.

It is envisaged that in an initial state, much of the data collected from trusted programs and processes or from non-suspicious activity at each node would not normally be sent to EDR backend 2. In the example of FIG. 2, only the process logs from "routine1.exe" and the IP addresses relating to "routine1.exe" have been selected and sent to EDR backend 2. It may be that "routine1.exe" is normally a trusted program and therefore selecting, sending, processing and analysing the binaries, hashes, user browser history (or indeed any other data) would be taking up valuable networking and computing resources with only a very low expectation of picking up signs of a security breach. There will be some Instances where this means that useful data is not initially selected and sent to EDR backend 2. This data Is not lost however as it is stored at node 5a or on a suitable storage location (not shown) on first computer network 1. The initial selection and sending policy of the data collectors can be set by the EDR provider (or determined automatically by the above-described algorithm) and are intended to be a trade-off between sending enough information to pick up Initial signs of a security breach on the one hand and minimising the use of networking and computing resources on the other.

In the embodiment shown in FIG. 2, it may be that "routine.exe" was only ever meant to send traffic to IP address 192.168.0.1 so the fact that IP address 192.168.0.2 is Included in the data may appear suspicious to the EDR system provider's security team or algorithms. In this case, a command may be sent to data collector 6a to send more or all of the remaining collected data. In the case where the rules are defined and controlled by the trained algorithm, the algorithm may automatically issue this command without human Intervention. In other words, the algorithm automatically determines that signs of a breach have been detected and automatically generates and sends a suitable command from EDR backend 2 to one or more nodes. The nodes, again without human intervention, receive the command and apply one or more different sets of rules according to what the algorithm has determined. It is envisaged that a log of the algorithm's actions may be generated for later review.

Once the next portion of data has been received, processed and analysed by EDR backend 2, the EDR system provider's security team or algorithms may determine that it was a false alarm, or they may determine that more data is required, or that there is a serious, ongoing breach Incident is occurring and that immediate further action is required.

Different data collectors may have different selecting and sending policies relative to each other which may be changed separately from each other. For example, if node 5a is known only to run trustworthy processes whereas node 5b is known to run more risky processes, data collector 6a is likely to be set up to select and send far less of the collected data than data collector 6b. If a sign of a security breach Is detected from data received from data collector 6b, the subsequent selection and sending performed by data collector 6b may be performed without effecting data collector 6a. Conversely, all of the data collectors 6a-6g, 4a may also be controlled in unison.

In general, by sending only the parts of the collected data based on the requirements of constantly changing circumstances, the EDR system of the present invention uses fewer networking and computing resources than an EDR system which collects and sends the total volume of collected data whilst still remaining more effective than an EDR system which implements selective data collection limitation. In particular, the granularity of the snapshot provided by the received data can by dynamically adjusted based on the need of the EDR system provider's security team and/or algorithms.

Figure 4A:
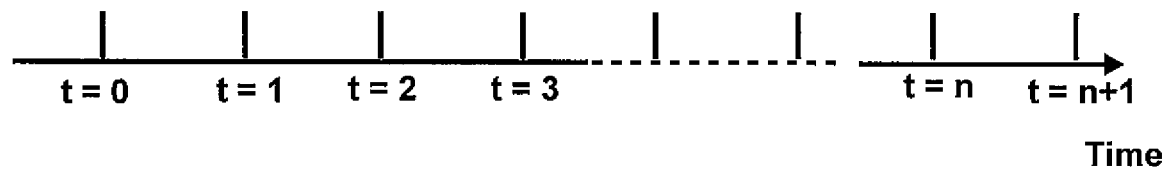
FIG. 4a is a timeline illustrating first predetermined time intervals.

FIG. 4a shows a timeline with predetermined time intervals t. Data collectors 6a-6g, 4a are initially configured to send the selected data at the predetermined time Intervals. By sending data at known, predetermined time intervals, network traffic from data collectors 6a-6g is predictable and can be controlled in such a way so as to maintain a small footprint and minimise its Impact on the first computer network 1. The predetermined time intervals are set initially by the EDR system provider upon installation or by commands sent to data collectors 6a-6g, 4a from EDR backend 2. For example, it may be that the selected data is sent from data collectors 6a-6g, 4a in predetermined time intervals of 5, 10 or 15 minutes. The shorter the time intervals, the greater the data collectors 6a-6g, 4a use up networking resources and bandwidth. Similarly, the shorter the time Intervals, the faster the computing resources at EDR backend 2 have to work to be able to process all of the received data before the next data update.

Figure 5:
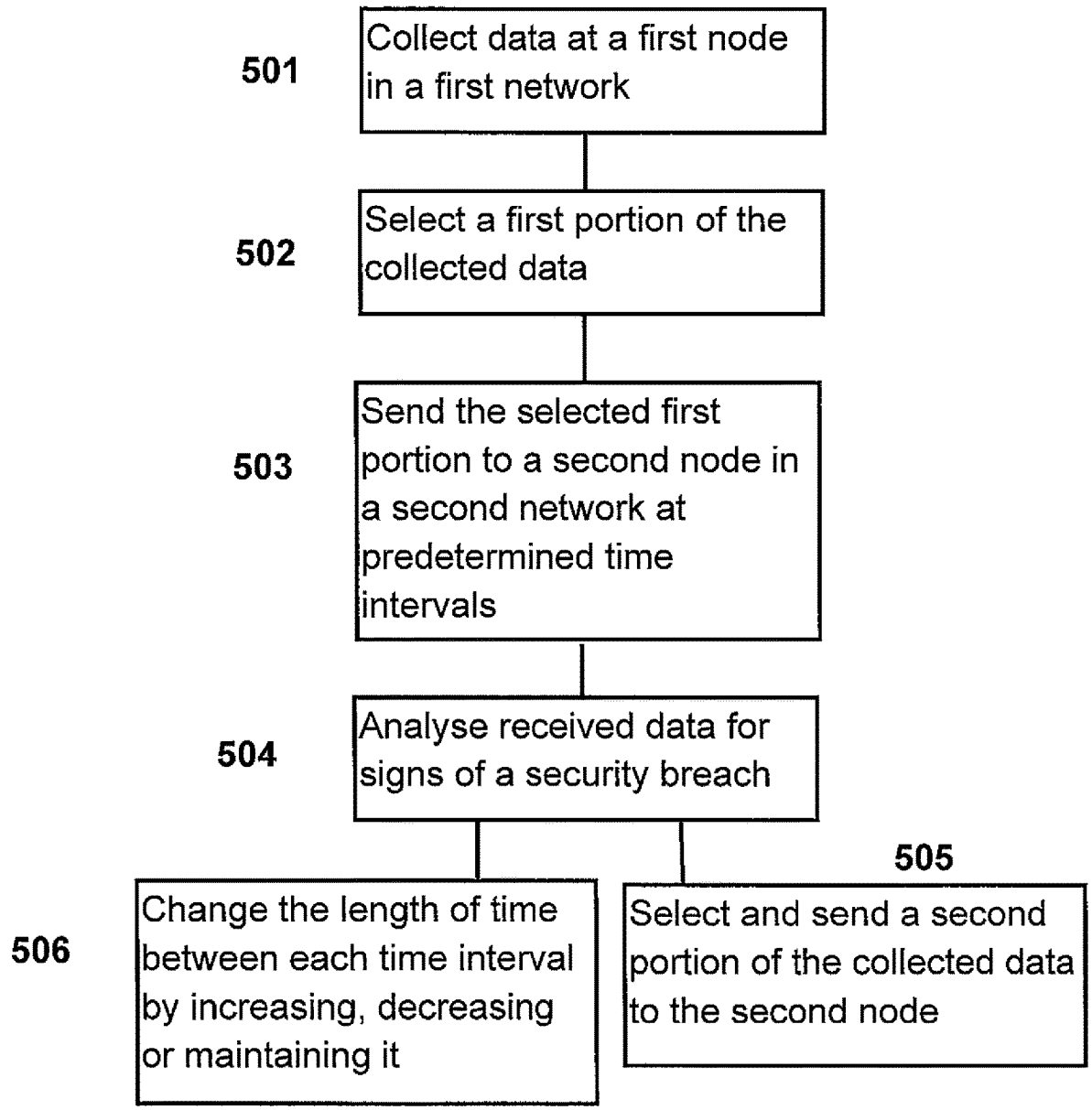
FIG. 5 is a flow diagram Illustrating a method according to an embodiment.

FIG. 5 shows a flowchart describing the steps of a method according to an embodiment.

Figure 4B:
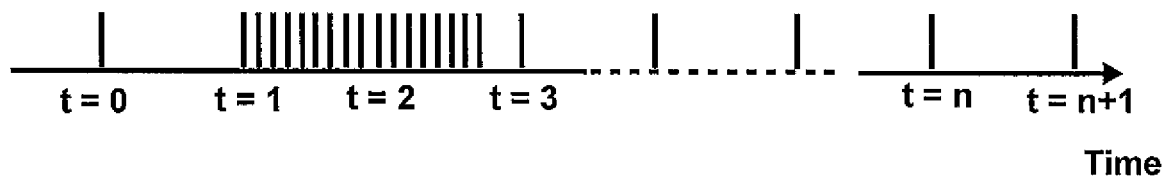
FIG. 4b is a timeline Illustrating second predetermined time Intervals.
Figure 4C:
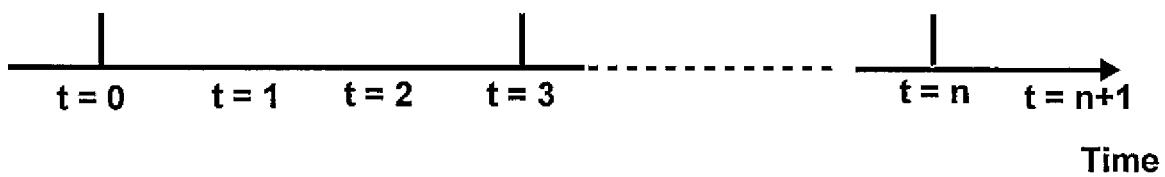
FIG. 4c is a timeline Illustrating third predetermined time intervals

The steps of collecting 501 data at a first node, selecting 502 a first portion of that data and sending 503 it to an EDR backend 2 to be analysed 504 for signs of a breach are the same as in FIG. 3, as is the step of selecting and sending a second portion of the collected data to the EDR backend 2 505. However, if the EDR system provider's security team or algorithms detect a sign of a security breach, it may be that there is no time to wait for the length of the predetermined time interval to receive the next data update. In such a case, the time interval length may be changed 506. For example, if a serious and ongoing security breach is detected, it may be that data updates are required every 30 seconds, 20 seconds or less. In this case, the length of time between each interval is reduced. FIG. 4b shows a timeline which is similar to FIG. 4a but in which some of the time intervals between t=1 and t=3 have been shortened. It may be that a sign of a security breach was detected at t=1, but that shortly before t=3 the EDR system provider's security team or algorithms determined that it was no longer necessary to receive data updates as often so the time intervals were increased in length again. The interval time length may also be increased (as shown in FIG. 4c), for example, because no sign of a breach was detected or because there was a false alarm. It may also be that, even if no sign of a breach is detected, the determination is made that the intervals should be maintained at their current length (for example because an attack is still expected based on other, outside intelligence).

In some instances, the interval length will be set to be sufficiently long (e.g. weeks or months) and the type of data sent minimal, such that the data collector is effectively not sending any data and only occasionally checks in with the EDR backend 2 to confirm that it is still functioning. This type of data collector is thus effectively in sleep mode but can be brought back online by decreasing the interval length again and changing what portion of the collected data is sent to the EDR backend 2. In this way, monitoring of the computer network can be scaled up and down based on constantly changing requirements.

Different data collectors may be set up with different predetermined time intervals relative to each other which may be changed separately from each other. For example, if node 5a is known only to run trustworthy processes whereas node 5b is known to run more risky processes, data collector 6b is likely to be set up with shorter predetermined time intervals than data collector 6a. If a sign of a security breach is detected from data received from data collector 6b, the subsequent time interval change relating to data collector 6b may be performed without effecting data collector 6a. Conversely, all of the data collectors 6a-6g, 4a may also be controlled in unison.

It is envisaged that the predetermined time periods may also be governed by the above-described rules defining data select and sending policies. In particular, if the trained algorithm automatically determines that higher or lower resolution data is needed or more suitable, the length of the predetermined time intervals can be altered as part of the commands issued autonomously by the algorithm and sent to the nodes.

By controlling the length of the predetermined time intervals based on the requirements of constantly changing circumstances, the EDR system of the present invention uses fewer networking and computing resources than an EDR system which collects and sends the total volume of collected data whilst still remaining more effective than an EDR system which implements selective data collection limitation. In particular, the granularity of the snapshot provided by the received data can be dynamically adjusted based on the needs of the EDR system provider's security team and/or algorithms.

It is envisaged that changes to the predetermined time interval lengths may be performed as required by the circumstances. For example, in some instances, it may be that after a first portion of data has been sent and analysed but no signs of a breach have been detected, the time intervals are reduced in length for a short while to ensure nothing has been missed (for example, because an analyst on the EDR system provider's security team feels something may still not be quite right).

Figure 6:
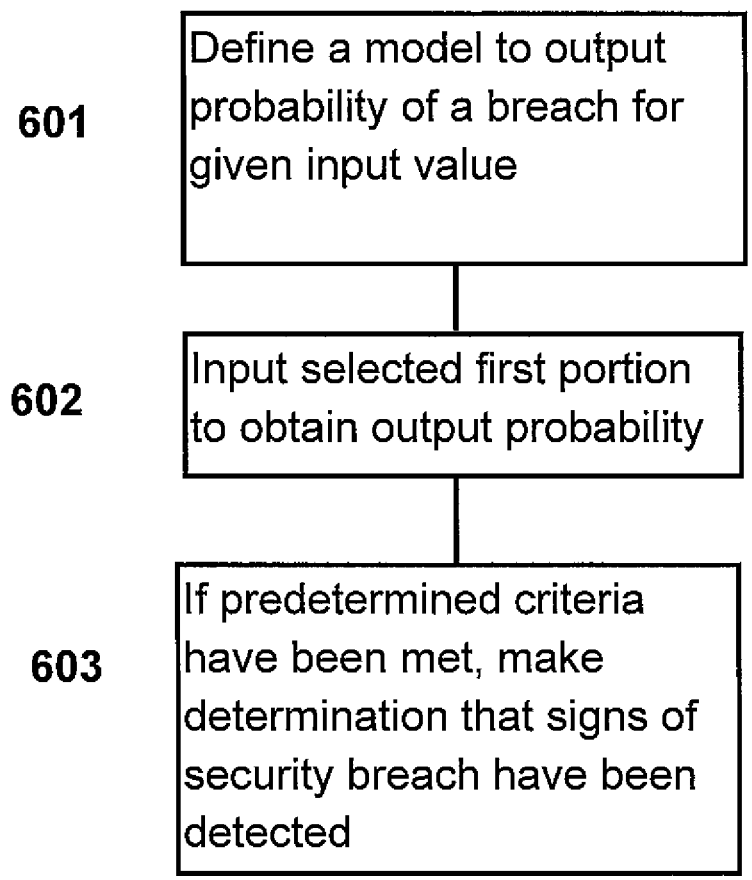
FIG. 6 is a flow diagram Illustrating a method according to an embodiment.

FIG. 6 shows a flowchart describing the steps of a method according to an embodiment.

As described above, changes to data collector selecting and sending policies and/or predetermined time interval lengths (i.e. the verbosity) arise from a determination made by the EDR system provider's security team or by an algorithm, or a mix of both, as part of the process during which signs of a security breach are detected. This determination may partly be made by defining 601 a model which outputs a probability that a security breach has occurred based on given input data. If the output probability meets certain predetermined criteria, the EDR system provider's security team and/or algorithms make the determination that a sign of a security breach has been detected. For example, predetermined criteria could include threshold probability values above which a sign is deemed likely to be indicative of a security breach. After the model has been defined 601, the selected first portion of data is fed into the model 602 to obtain an output probability that a security breach has occurred. The output probability value is then compared to the predetermined criteria in order to make a determination as to whether or not signs of a security breach have been detected. As shown in model 603 of FIG. 6 if predetermined criteria have been met, there is making a determination that signs of a security breach have been detected.

The step of inputting the selected first portion into the model may be performed at either the node from which the data was collected or at the EDR backend 2 depending on the set up of the EDR system.

For example, where the processing resources required to feed the first portion into the model and to make the determination that a sign has been detected is minimal, such that a small footprint can be maintained, the node from which the data was collected can be used to run the model to obtain the output probability and to make the determination. This is particularly applicable to scenarios where the determination is made by algorithms rather than by a member of the EDR system provider's security team. In such a scenario, the decision to send a second portion of data to the EDR backend 2 and/or the decision to change the length of time between the predetermined time intervals is thus made entirely at one node (i.e. the first node) without intervention from the EDR backend 2.

As described above, it is envisaged that there will be some systems in which changes to the data collector selecting and sending policies and/or the predetermined time interval lengths win be performed largely autonomously based on the output probabilities of the defined model. For example, consider again the example of FIG. 2. After the data corresponding to the two IP addresses (192.168.0.1 and 192.168.0.2) and the process log "routine1.exe" has been selected, it may be input into the defined model at the first node, in addition to being sent to EDR backend 2. The output probability obtained at the first node may meet predetermined criteria as a result of the presence of the second IP address in the data. The algorithms running at the first node thus make the determination that a sign of a breach has been detected and can issue commands to send a second portion of data, specifying what it will contain, and/or commands to change the length of time between each of the predetermined time intervals. Thus the commands all originate from the first node and without Intervention from EDR backend 2. The EDR system provider's security team may then subsequently receive various alerts from the first node setting out what changes to the data collector selecting and sending policies and/or the predetermined time interval lengths have been made by the algorithm. In some instances, the algorithms running at the first node may also issue the same or similar commands to other nodes in the first computer network 1, again without intervention from EDR backend 2. For example, commands may be issued to any node neighbouring the first node based on the assumption that if a security breach has occurred at the first node, it is likely that the neighbouring nodes will also be at risk.

In another example where it is not possible to run the model and make determinations at the node from which the first portion was collected, the selected first portion is input into the model at the EDR backend 2. The determination that a sign of a security breach has been detected is thus made by the EDR system provider's security team and/or by algorithms running at the EDR backend 2. The EDR backend can then issue commands to the first node to send a second portion of data, specifying what it will contain, and/or commands to change the length of time between each of the predetermined time intervals. As noted above, the commands may be sent separately to one or more nodes or to all of the nodes together.

As described above, the nature of the model used by the EDR system may be, or may incorporate elements, from one or more of the following: a neural network trained using a training data set, exact or heuristic rules (e.g. hardcoded logic), fuzzy logic based modelling, and statistical inference based modelling. The model may be defined to take into account particular patterns, files, processes, connections, and dependencies between processes.

Where the model is based on or Incorporates machine learning, the data from which it learns may be compiled from monitoring actions executed by programs running at the first node. Example machine learning techniques include training a neural network using supervised learning, unsupervised learning, and/or deep learning, although any suitable technique is also envisaged. The training can be determined to be complete when a predetermined error rate threshold has been met or when the model has been trained with a predetermined amount of training data, as determined by the EDR system provider.

Figure 7:
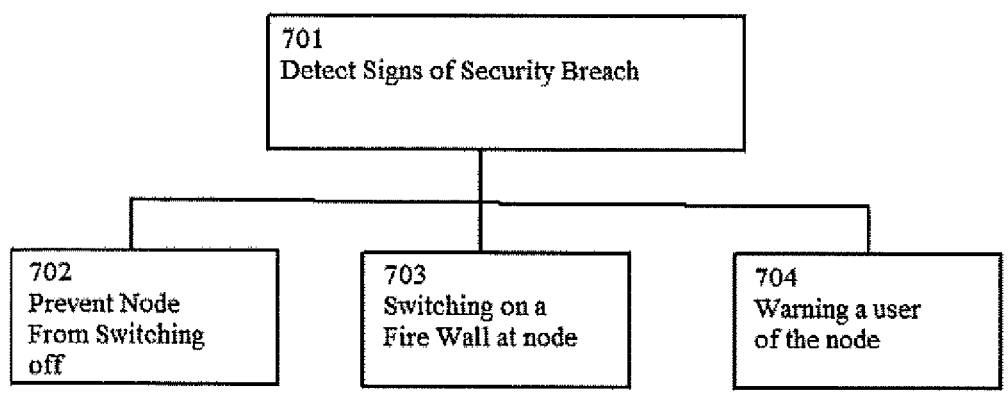
FIG. 7 is a flow diagram Illustrating a method according to an embodiment.

FIG. 7 shows a flowchart describing the steps of a method according to an embodiment.

If a sign of a breach is detected, it may be necessary in some instances to take immediate action by changing the settings of the first nodes in order to ensure an attacker is stopped and any traces of their moves is not destroyed. Changing the settings may include, for example, one or more nodes (which may be computers or other devices) being prevented from being switched off in order to preserve information in RAM, a firewall may be switched on at one or more nodes to cut off the attacker immediately, users of the one or more nodes may be warned that a breach has been detected and that their workstation is under investigation, and/or a system update or software patch may be sent from the EDR backend 2 to the nodes in response to detecting a sign of a breach. As shown in step 701 of FIG. 7 there is detecting signs of a security breach. As shown in step 702 of FIG. 7 there is preventing a node from switching off. As shown in step 703 of FIG. 7 there is switching on a fire wall at the node. Then as shown in step 704 of FIG. 7 there is warning a user of the node. It is envisaged that one or more of these actions may be initiated automatically by the above-described algorithms. For example, using the above described methods, data has been collected and a first portion has been selected and sent (according to first rules) from the nodes in the computer network 1 to the EDR backend 2. The trained algorithm has automatically determined that a sign of a breach was detected and a second portion of data has been selected and sent (according to second rules). As soon as the algorithm makes the determination that a sign of a breach was detected, it may generate and issue a command to the first nodes without human intervention to automatically initiate one or more of the above-described actions at the first nodes. By doing this, a breach can be stopped and/or the damage minimised automatically at very high speeds and without human intervention.

It is envisaged that the action of automatically updating system software or sending software patches in response to detecting a sign of a breach will be particularly effective for corporate computer networks whose administrators apply updates and patches only in bulk at infrequent intervals. The method allows such administrators to continue their existing policies without disruption but gives the EDR system an autonomous, automatic override to apply updates and patches in emergency situations without human intervention. For example if a breach occurs at night and the administrator cannot be contacted, the EDR system automatically performs the necessary actions. By the time the administrator is contacted again, the computers on the network have been safely updated and the spread of the attack minimised. Attacks using zero-day exploits in particular can be stopped in their tracks by such a method.

The above-described methods contrasts with existing security products (both EPPs and EDR systems) where most of the data collection, processing, and analysing procedures are manual such that it would not be possible to implement automatic response actions at equally high speeds and accuracy. This technical advantage is particularly realised over traditional systems which are based on human instinct and experience of security teams, intelligent guessing, and traditional statistics. Whilst such traditional systems are implemented using computers (given the nature of the technical field of the invention), they still ultimately rely on human decision making. As such, the present invention is more than merely automation of traditional techniques and it does not pre-empt the traditional, manual systems described above.

A further advantage provided by the above described EDR system and associated methods which Is not provided by existing EDR systems is it overcomes a barrier to EDR take up in the industry resulting from corporate IT security rules which prohibit the sending of highly sensitive information outside of corporate networks except in exceptional circumstances. In existing EDR systems, al collected data is sent to an EDR backend so, in order to avoid breaking corporate IT security rules, sensitive information will never be collected. If that sensitive information contains key data necessary to forensically detect and analyse a breach, the EDR system will be ineffective. In contrast, the above-described EDR system and methods will collect all data (including sensitive information) but can be set up so that sensitive information will not normally form part of the selected first portion. It can however later be included in a selected second portion after the organisation has given consent (for example in the case of a serious, ongoing security breach which must be dealt with Immediately). This allows organisations with strict corporate IT security rules to use EDR systems without giving up control of sensitive information.

The code required to implement data collectors ("sensors") may be based on Google™ GRR ("rapid response"), Facebook™ osquery, or can be built from scratch. It is envisaged that whatever code Is used, it should at least be capable of performing the commands of: get file hashes on demand, download files from specified directories, dump network traffic, connections and processes. It must also be able to collect different types of data not normally associated with security systems but which can still be useful in EDR systems.

The invention claimed is:

1. A method of probing and responding to a security breach in a computer network, the method comprising:
 defining, by a device, first rules and second rules;
 defining a model to output a probability that a security breach has occurred based on an input and to generate commands;
 collecting data at a plurality of first nodes according to the first rules, said first nodes forming a first computer network;
 storing the collected data at one or more of the plurality of first nodes or at a dedicated storage location on the first computer network;
 selecting a first portion of the collected data according to the first rules, wherein the first portion is less than the collected data;
 sending the selected first portion from the first nodes to a second node, said second node forming part of a second computer network,
 wherein the sending the selected first portion is based on an adjustment of a verbosity level of at least one program of the device minimizing and prioritizing data volume of the first portion,
 wherein the adjustment of the verbosity level is based on a determination of whether the at least one program is not known and trusted, and
 wherein the verbosity level is changed from a default setting at a start of the at least one program based on the at least one program being determined to not be known and trusted;
 inputting the selected first portion into the model to obtain an output probability that a security breach has occurred; and
 if the output probability meets predetermined criteria:
 (a) determining that signs of a security breach have been detected, (b) generating a first command with the model to cause a second portion of the collected data to be selected and sent from the first nodes to the second node according to the second rules,
wherein the second rules are dynamically created in response to the detected security breach to at least select and send a volume of the collected data based on a set of at least one of default selecting or sending policies associated with the verbosity level started by the device that is changed during execution of the sending, and
wherein the verbosity level is changed dynamically to at least one of increase, decrease, or balance the second portion of the collected data for the selecting or sending policies at a next available predetermined time interval based on predetermined criteria comprising threshold probability values indicative of a security breach and a trust level of an application from which the collected data is received; and
(c) generating a second command with the model to cause a change in settings at one or more of the first nodes.

2. A method according to claim 1, wherein said sending of the volume of the collected data comprises sending selected first and second portions of the collected data at first predetermined time intervals.

3. A method according to claim 2, comprising:
if the output probability meets the predetermined criteria, generating a third command with the model to cause the length of time between each of the first predetermined time intervals to be changed.

4. A method according to claim 3, wherein said changing comprises decreasing the length of time between each of the first predetermined time intervals.

5. A method according to claim 3,
wherein said inputting is performed at the second node; and said first, second, and third commands are generated by the model at the second node, or
said inputting isperformed at the first nodes and said first, second, and third commands are generated by the model at the first node.

6. A method according to claim 1, wherein
at least a hash of the at least one program is used for the determination that the at least one program is not known and trusted, and
wherein the verbosity level is increased from the default setting at the start of the at least one program based on the at least one program being determined to not be known and trusted.

7. A method according to claim 1, wherein
said defining a model comprises training a neural network using a training data set; and
said defining first and second rules is performed by the trained neural network.

8. A method according to claim 1, wherein said defining a model comprises defining exact or heuristic rules.

9. A method according to claim 1, wherein said defining a model comprise defining a fuzzy logic based model.

10. A method according to claim 1, wherein said defining a model comprises defining a statistical inference based model.

11. A method according to claim 1, comprising defining third rules; and
if the output probability meets predetermined criteria:
generating a fourth command with the model to cause a third portion of the collected data to be selected according to the third rules and sent from the first nodes to the second node; and
performing sending of a selected third portion at second predetermined time intervals.

12. A method according to claim 11, wherein the first, second and third portion comprise one or more selected from the list of: program or file hashes, files stored at the first nodes, logs of network traffic, logs of network connections, process logs, binaries or files carved from memory, and logs from monitoring actions executed by programs running at the first nodes.

13. A method according to claim 12, wherein said training data set is compiled from said logs from monitoring actions executed by programs running at the fist node and said training is determined to be complete when a predetermined error rate threshold has been met or when the model has been trained on a predetermined amount of training data.

14. A method according to claim 11, comprising
generating a command with the model to cause the remainder of the collected data which does not form part of the first, the second or the third portion to be sent from the first nodes to the second node.

15. A method according to claim 1, comprising storing the collected data at one or more of the first nodes, or
at a dedicated storage location on the first computer network.

16. A method according to claim 1, wherein said change in settings comprises one or more of the list of:
preventing one or more of the first nodes from being switched off;
switching on a firewall at one or more of the first nodes;
warning a user of one or more of the first nodes that signs of a security breach have been detected; and/or sending a software update to one or more of the first nodes.

17. A method according to claim 1, wherein the second portion of the collected data comprises a portion of the collected data different than the first portion of collected data.

18. The method according to claim 1, wherein the verbosity level for a specific program or group of programs of the at least one program changes the selected first portion sent to the second node forming part of the second computer network to a defined minimal value based on at least one predefined data collection condition being met in order to enable the second node to reduce a required time for reception, processing, and analyzing the selected portion of data.

19. A network security system comprising:
a plurality of first computers being first nodes in a first computer network;
a second computer being a second node in a second computer network; and
a model to output a probability that a security breach has occurred based on an input and to generate commands,
wherein the plurality of first computers are configured to:
collect data at the first node according to first rules,
store the collected data at one or more of the plurality of first nodes or at a dedicated storage location on the first computer network, and
select a first portion of the collected data according to the first rules, wherein the first portion is less than the collected data; and
to send the selected first portion to the second computer, wherein the sending the selected first portion is based on adjustment of a default verbosity level of at least one program of the device minimizing and prioritizing data volume of the first portion, wherein the adjustment of the verbosity level is based on a determination of whether the at least one program is not known and trusted, and wherein the verbosity level is changed from a default setting at a start of the at least one program based on the at least one program being determined to not be known and trusted, wherein the plurality of first computers are further configured to receive commands generated by the model to, if the output probability meets predetermined criteria, select a second portion of the collected data according to second rules, wherein the second rules are dynamically created in response to the detected security breach to at least select and send a volume of the collected data based on a set of at least one of default selecting or sending policies associated with the verbosity level started by the device that is changed during execution of the sending, and wherein the verbosity level is changed dynamically to at least one of increase, decrease, or balance the second portion of the collected data for the selecting or sending policies at a next available predetermined time interval based on predetermined criteria comprising threshold probability values indicative of a security breach and a trust level of an application from which the collected data is received; and send the selected second portion to the second computer, and change settings of one or more of the first computers.

20. A computer program product comprising a non-transitory computer storage medium having computer code stored thereon which, when executed on a computer system, causes the network security system to perform operations according to claim 19.

* * * * *